United States Patent
Song

(10) Patent No.: US 6,626,451 B1
(45) Date of Patent: Sep. 30, 2003

(54) COLLAPSIBLE STROLLER

(75) Inventor: Zhenghuan Song, Kunshan (CN)

(73) Assignee: Goodbaby Child Products Co., Ltd., Kunshan (CN)

( * ) Notice: Subject to any disclaimer, the term of this patent is extended or adjusted under 35 U.S.C. 154(b) by 0 days.

(21) Appl. No.: 09/868,422

(22) PCT Filed: Oct. 21, 1999

(86) PCT No.: PCT/CN99/00164

§ 371 (c)(1),
(2), (4) Date: Aug. 30, 2001

(87) PCT Pub. No.: WO00/37297

PCT Pub. Date: Jun. 29, 2000

(30) Foreign Application Priority Data

Dec. 18, 1998 (CN) ............................................. 98247342
Jul. 22, 1999 (CN) ............................................. 99113912

(51) Int. Cl.$^7$ ................................................. B62B 7/06
(52) U.S. Cl. ......................................... 280/642; 280/650
(58) Field of Search ................................. 280/641, 642, 280/647, 650, 47.38, 639; 297/354.43, 378.1, 16.1, 31, 59

(56) References Cited

U.S. PATENT DOCUMENTS

| | | | | |
|---|---|---|---|---|
| 3,873,116 A | * | 3/1975 | Perego | 280/47.38 |
| 4,887,834 A | * | 12/1989 | Cabagnero | 280/642 |
| 4,953,887 A | * | 9/1990 | Takahashi et al. | 280/650 |
| 4,993,743 A | * | 2/1991 | Takahashi et al. | 280/642 |
| 5,417,450 A | * | 5/1995 | Wang | 280/642 |
| 5,482,311 A | * | 1/1996 | Huang | 280/642 |
| 5,605,409 A | | 2/1997 | Haut et al. | 403/102 |
| 5,622,377 A | | 4/1997 | Shamie | 280/642 |
| 5,669,623 A | * | 9/1997 | Onishi | 280/642 |
| 5,725,238 A | * | 3/1998 | Huang | 280/642 |
| 5,934,153 A | * | 8/1999 | Yang | 280/642 |
| 5,938,229 A | * | 8/1999 | Chen et al. | 280/642 |
| 5,979,928 A | * | 11/1999 | Kuo | 280/642 |
| 6,068,284 A | * | 5/2000 | Kakuda | 280/642 |
| 6,206,405 B1 | * | 3/2001 | Watkins | 280/647 |

FOREIGN PATENT DOCUMENTS

CN 2269995 Y 12/1997
CN 2300560 Y 12/1998

* cited by examiner

Primary Examiner—Brian L. Johnson
Assistant Examiner—Christopher Bottorff
(74) Attorney, Agent, or Firm—Procopio, Cory, Hargreaves & Savitch, LLP

(57) ABSTRACT

A collapsible stroller includes a handle rod; two sub-frames connected to the handle rod, the two sub-frames including a front leg with an upper end and a rotatable front wheel disposed under the front leg, and a rear leg with a an upper end and a rotatable rear wheel disposed under the rear leg, the upper end of the front leg rotatably connected to the upper end of the rear leg; a front connecting rod including one end rotatably connected to the handle rod and an other end rotatably connected to the upper end of the front leg and the upper end of the rear leg; a seat mounted between the sub-frames for carrying an occupant; a front supporting rod rotatably mounted to the front leg; a rear supporting rod rotatably connected to the front supporting rod and mounted to the rear leg; a first pull rod rotatably connected to the rear leg, the first pull rod including an end rotatably connected to the handle rod and an other end; and a second pull rod including an end rotatably coupled to the other end of the first pull rod and an other end rotatably connected to the front supporting rod and the rear supporting rod.

10 Claims, 7 Drawing Sheets

COLLAPSIBLE STROLLER

FIELD OF THE INVENTION

This present invention relates to a stroller and, more particularly, to a collapsible stroller which can be readily collapsed and locked in a collapsed position.

BACKGROUND OF THE INVENTION

In the prior art, U.S. Pat. No. 5,605,409 has disclosed a structure of a conventional collapsible stroller including two sub-frames and a lateral connecting rod interconnecting the two sub-frames. The sub-frame includes a front leg, a front wheel sitting under the front leg connected thereto, a rear leg, a rear wheel positioned under the rear leg connected thereto, a supporting rotary rod connected to the front leg and rear leg respectively, a handle rod whose front end can be rotatably connected to the upper end of the front leg. The upper end of the rear leg is rotatably connected to the handle rod. In this patent, a locking device is configured where the handle rod is connected to the front leg. When the stroller is collapsed, the handle rod is revised toward the rear potion where the operator is located. In the collapsed condition, the stroller cannot vertically stand up on its own but has to rest on the ground since the front wheels and the rear wheels of the collapsed stroller do not stand on the same plane.

In contrast, the present invention includes a collapsible stroller that, when collapsed, can vertically stand up on its own through the support of its front wheels and rear wheels.

SUMMARY OF THE INVENTION

The present invention provides a collapsible stroller, which comprises: a handle rod; two sub-frames connected to the handle rod, including a front leg, a rotatable front wheel disposed under the front leg, a rear leg, a rotatable rear wheel sitting under the rear leg; a connecting rod interconnecting the two sub-frames; a front connecting rod disposed between the handle rod and the front leg or the rear leg; and a seat mounted between the sub-frames for receiving an occupant such as a baby, wherein a front supporting rod is rotatably connected to the front leg, a rear supporting rod is rotatably connected to the rear leg, the front supporting rod is rotatably connected to the rear supporting rod, the upper end of the front leg is rotatably connected to that of the rear leg, the rear leg is rotatably connected to a first pull rod with one end rotatably connected to the handle rod and the other end rotatably connected to one end of a second pull rod, the other end of the second pull rod is rotatably connected to the front supporting rod or the rear supporting rod, one end of the front connecting rod is rotatably connected to the handle rod, and the other end of the front connecting rod is rotatably connected to the front leg or rear leg.

PREFERRED EMBODIMENT OF THE INVENTION

Figure 1:
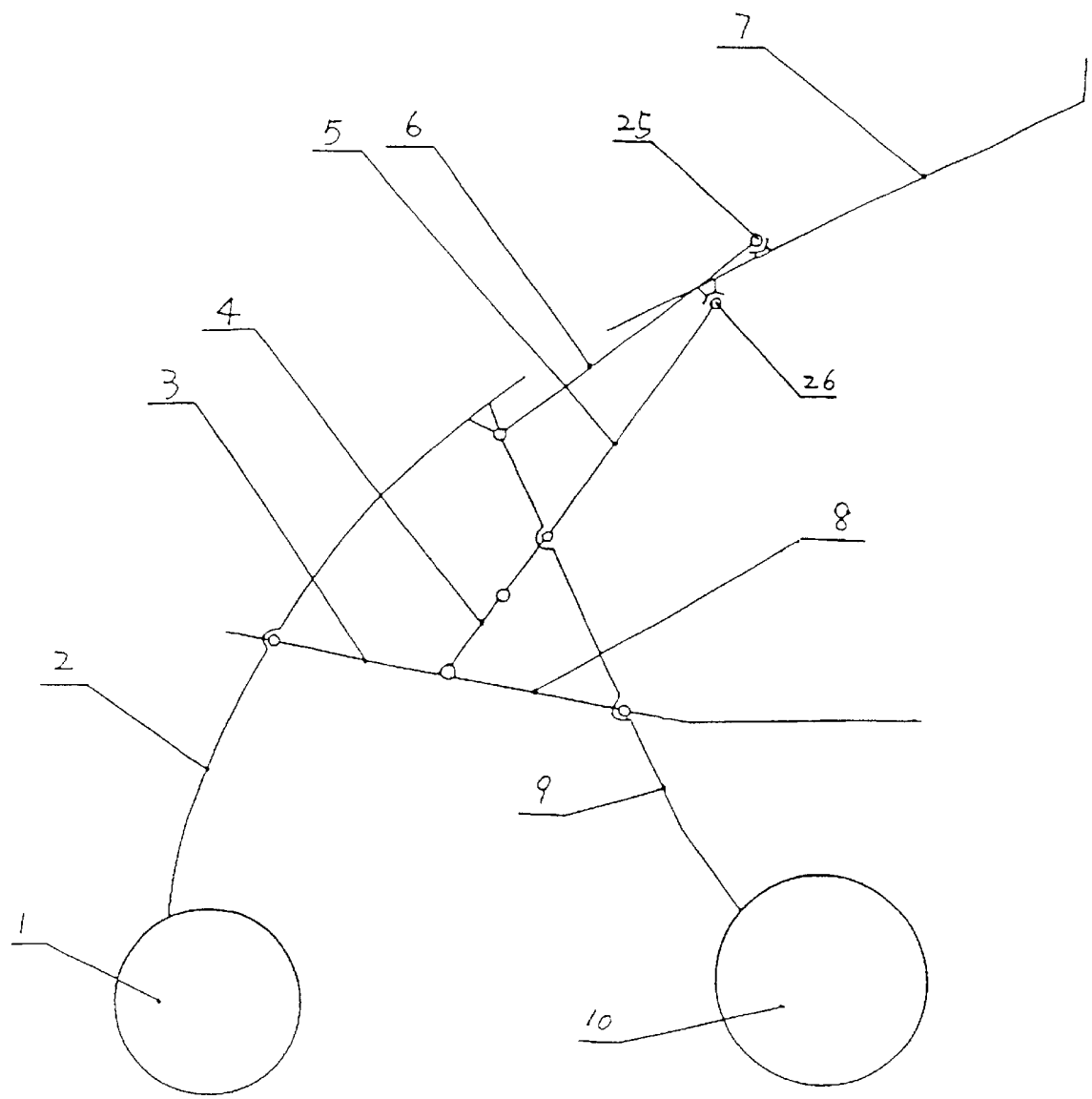
FIG. 1 is a diagrammatic sketch showing an embodiment of the structure of the sub-frame of a stroller in a non-collapsed.
Figure 2:
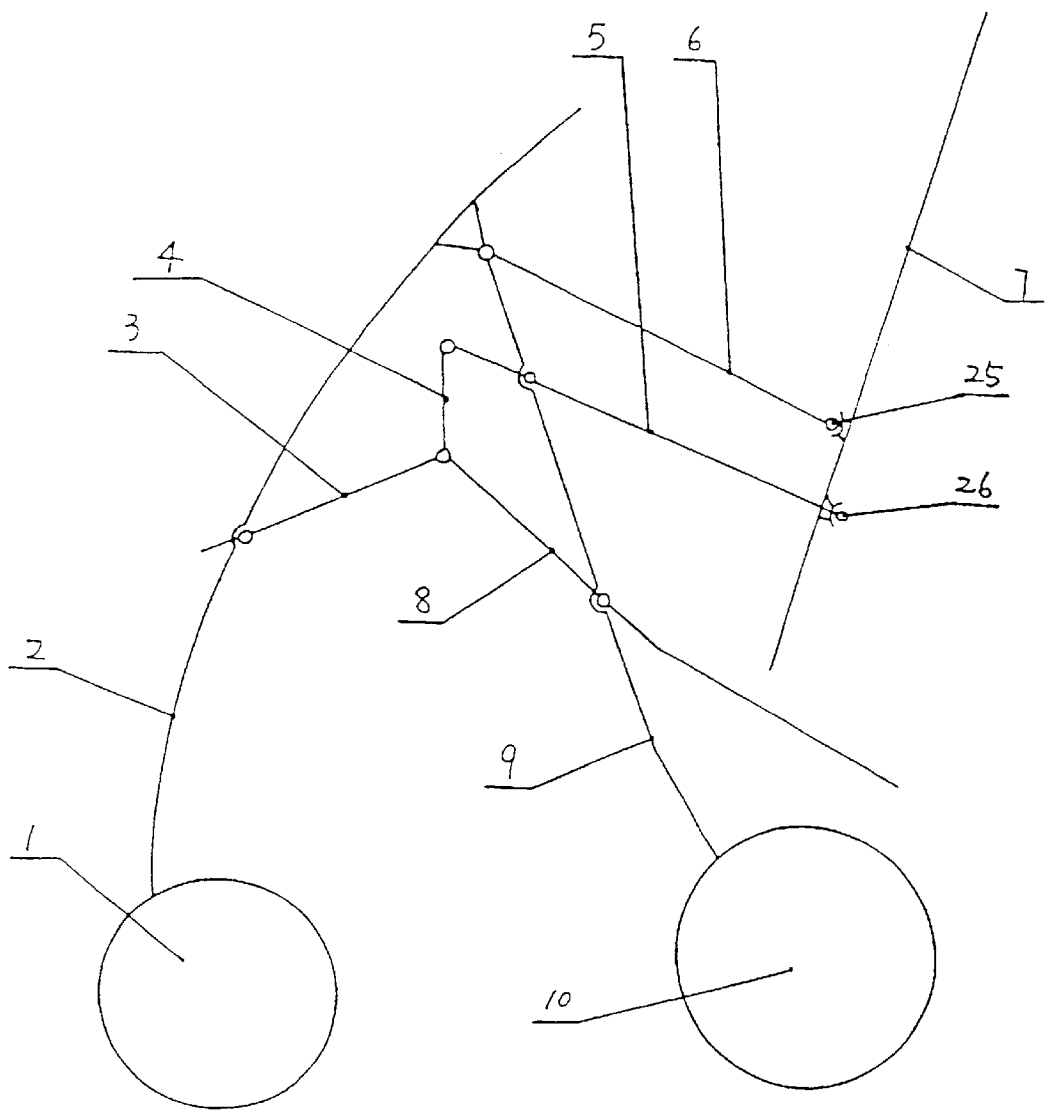
FIG. 2 is a diagrammatic sketch of the structure of the sub-frame illustrated in FIG. 1 in a partially collapsed position.

The present invention will be further described in conjunction with the accompanying drawings.

The term "rotatable" or "rotatably" used in the invention means "pivotable" or "pivotably". Referring now to FIGS. 1 through 6, a collapsible stroller in accordance with the invention includes two sub-frames, a connecting rod is interconnected between the two sub-frames laterally, and a seat 14 mounted between the two sub-frames for receiving the baby. The sub-frame includes a front leg 2, a rotatable front wheel 1 disposed under the front leg 2, a rear leg 9, and a rotatable rear wheel 10 disposed under the rear leg 9. In one embodiment of the invention, the collapsible stroller further comprises front supporting rod 3 rotatably connected to the front leg 2, a rear supporting rod 8 is rotatably connected to the rear leg 9. The front supporting rod 3 is rotatably connected to the rear supporting rod 8. The rotatable connecting point of the front supporting rod 3 and the rear supporting rod 8 is located between the front leg 2 and the rear leg 9, and the front supporting rod 3 and rear supporting rod 8 are aligned in a line when the collapsible stroller is in a non-collapsed position.

Figure 3:
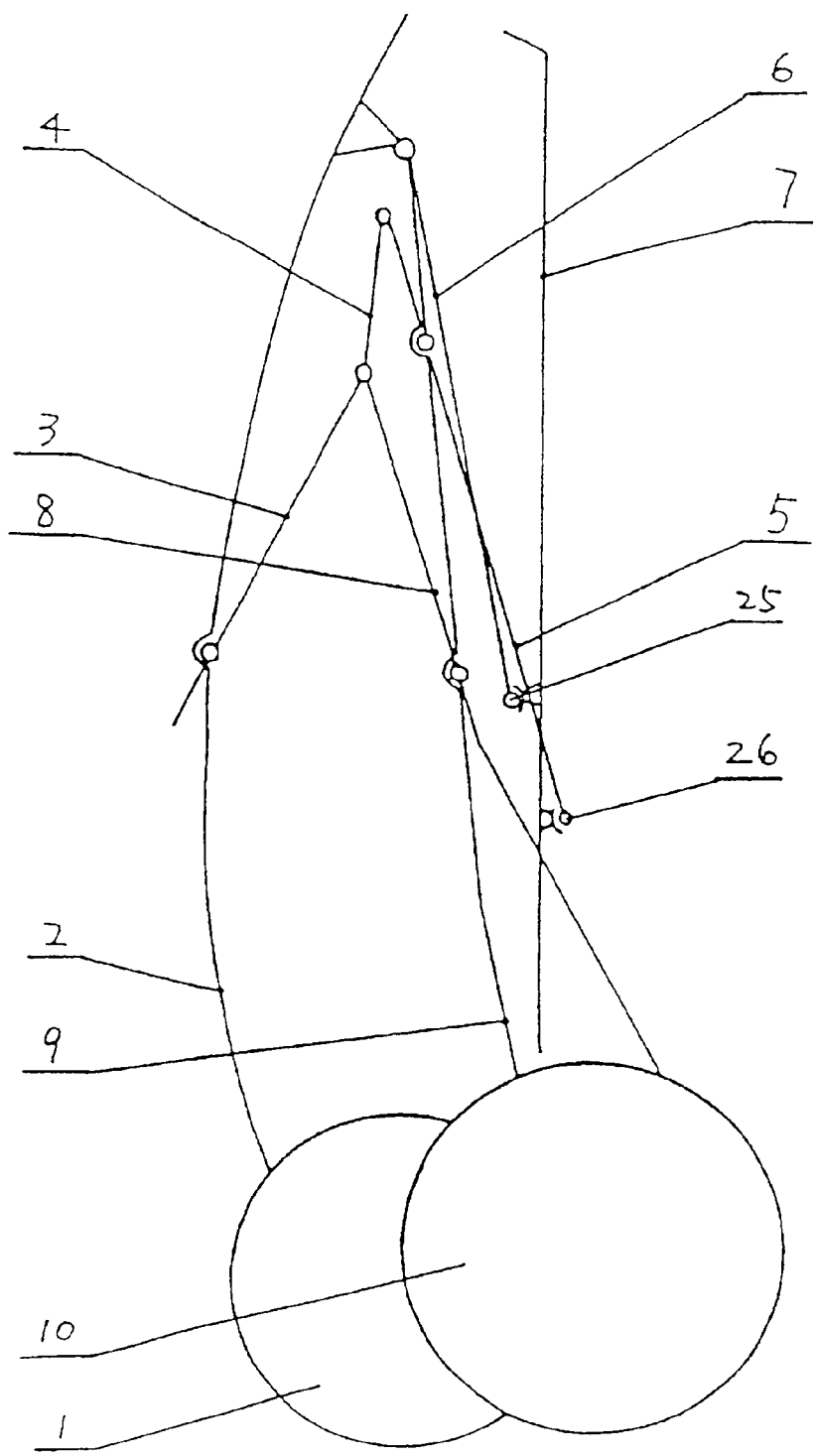
FIG. 3 is a diagrammatic sketch of the structure of the sub-frame illustrated in FIG. 1 in a collapsed position.
Figure 4:
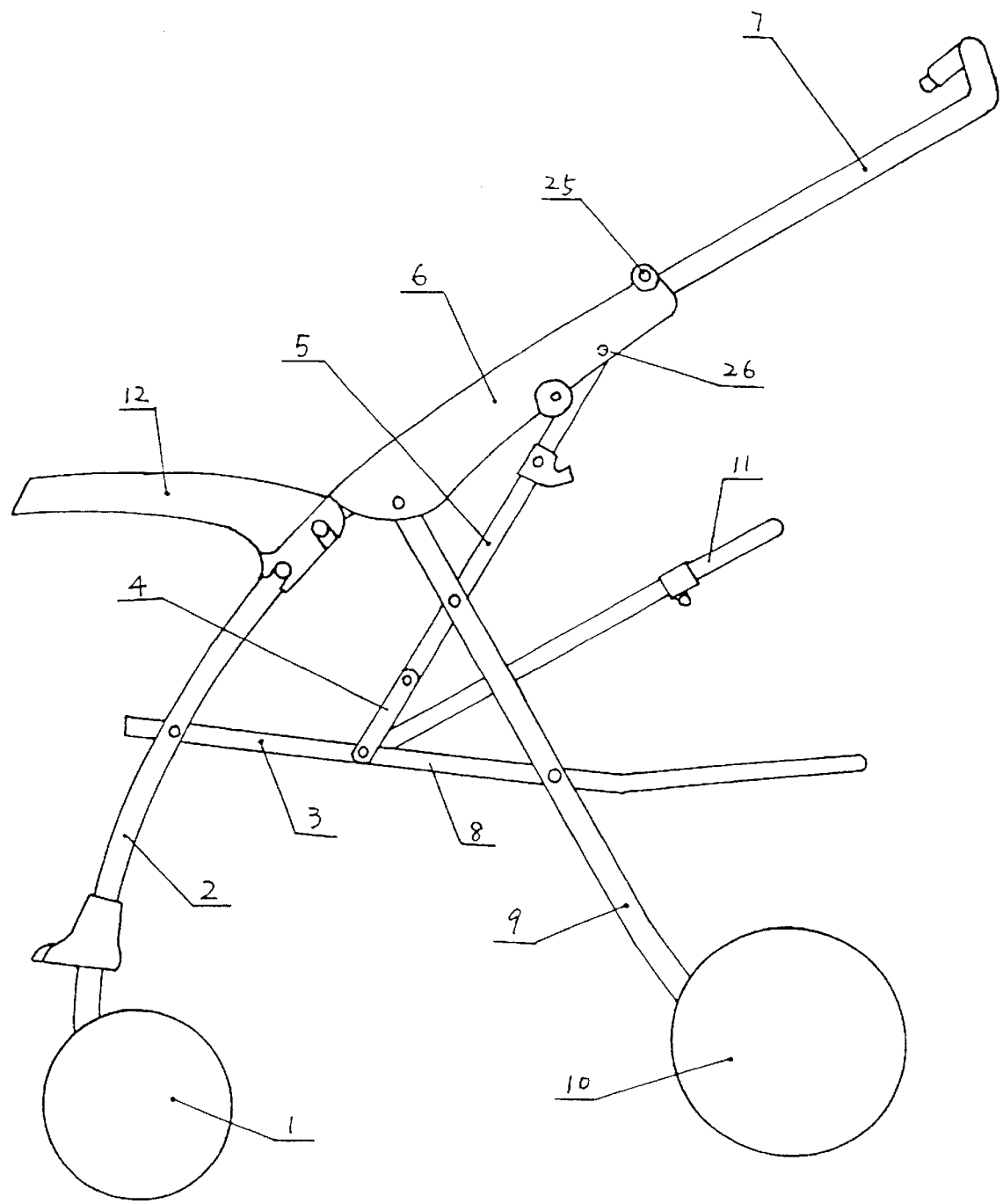
FIG. 4 is a side-elevational view of an embodiment of the structure of the sub-frame of a stroller in a non-collapsed position.
Figure 5:
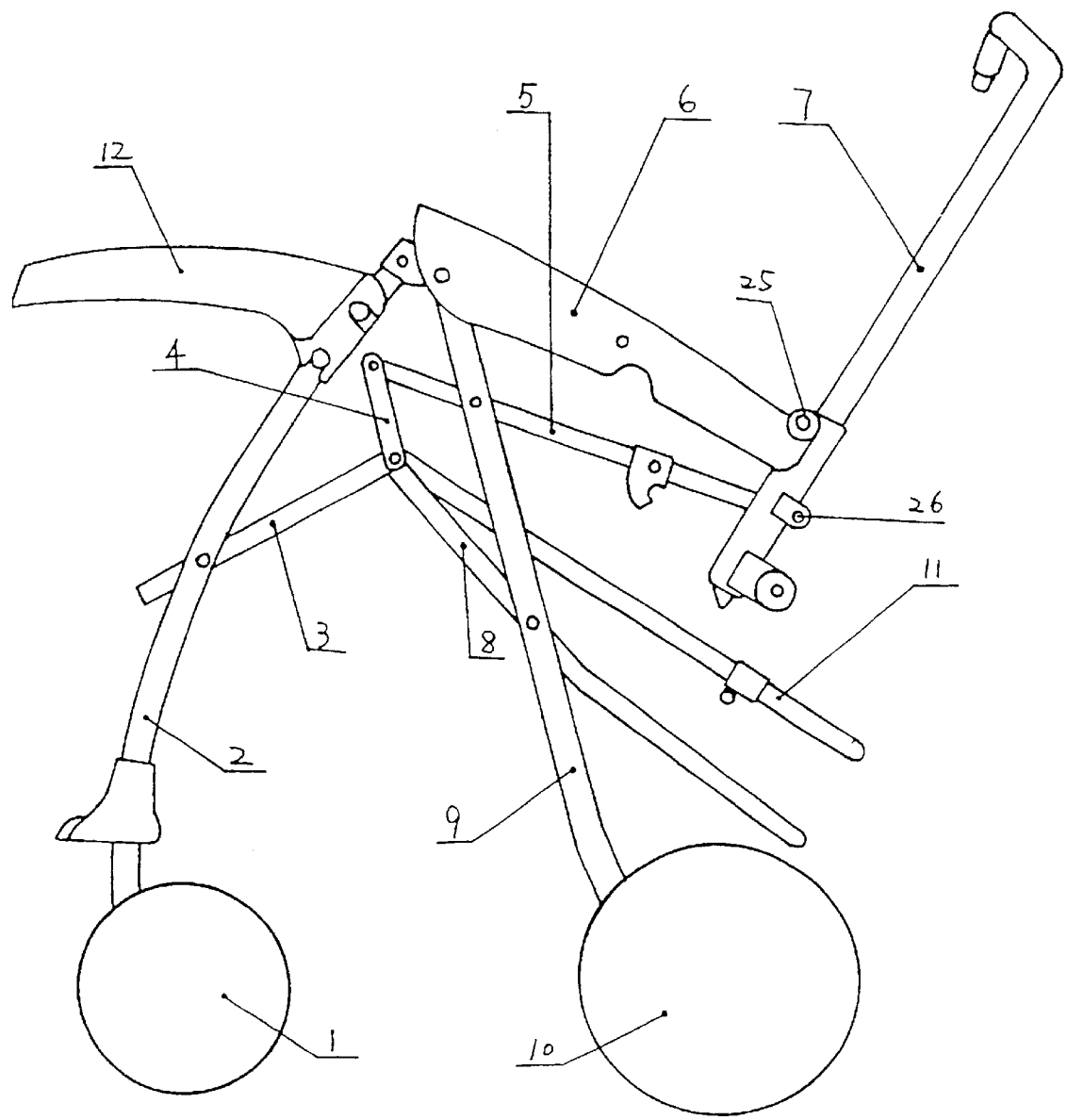
FIG. 5 is a side-elevational view of the structure of the sub-frame illustrated in FIG. 1 in a partially collapsed position.

The upper portion of the front leg 2 is rotatably connected to that of the rear leg 9. As shown in FIG. 3, the distance from the rotatable connecting point of the front leg 2 and the rear leg to the ground-contacting point of the front wheel 1 is equal to the distance from the rotatable connecting point to the ground-contacting point of the rear wheel 10 so that the front leg 2 and the rear leg 9 look like equal sides of an isosceles triangle when the collapsible stroller is in a collapsed position. Thus, the stroller can stand up steadily with the support of the front wheel 1 and the rear wheel 10.

The rear leg 9 is rotatably connected to a first pull rod 5, which includes one end connected to one end of a second pull rod 4. The other end of the second pull rod 4 is rotatably connected to the front supporting rod 3 or the rear supporting rod 8. In this embodiment, the other end of the second pull end 4 is rotatably connected to a rotatable connecting pivot of the front supporting rod 3 and the rear supporting rod 8.

The other end of the first pull rod 5 is rotatably connected to a handle rod 7 by a connecting axle 26. The handle rod 7 is rotatably connected to one end of a front connecting rod 6 at a connecting axle 25, while the other end of the front connecting rod 6 is rotatably connected to the front leg 2 or the rear leg 9. In this embodiment, the other end of the front connecting rod 6 is rotatably connected to a rotatable connecting pivot of the front leg 2 and the rear leg 9. The rotatable connecting point of the handle rod 7 and the front connecting rod 6 is located rearwardly of the rotatable connecting point of the handle rod 7 and the first pull rod 5.

The first pull rod 5 is rotatably connected to the rear leg 9 between the rotatable connecting point of the rear leg 9 and the front leg 2 and that of the rear leg 9 and the rear supporting rod 8. The front leg 2, the front connecting rod 6, and the handle rod 7 are substantially located in line when the stroller is in a non-collapsed position. Moreover, a basket 16 may hang from a supporting rod, which is comprised of the rear supporting rod 8 and the front supporting rod 3.

Figure 6:
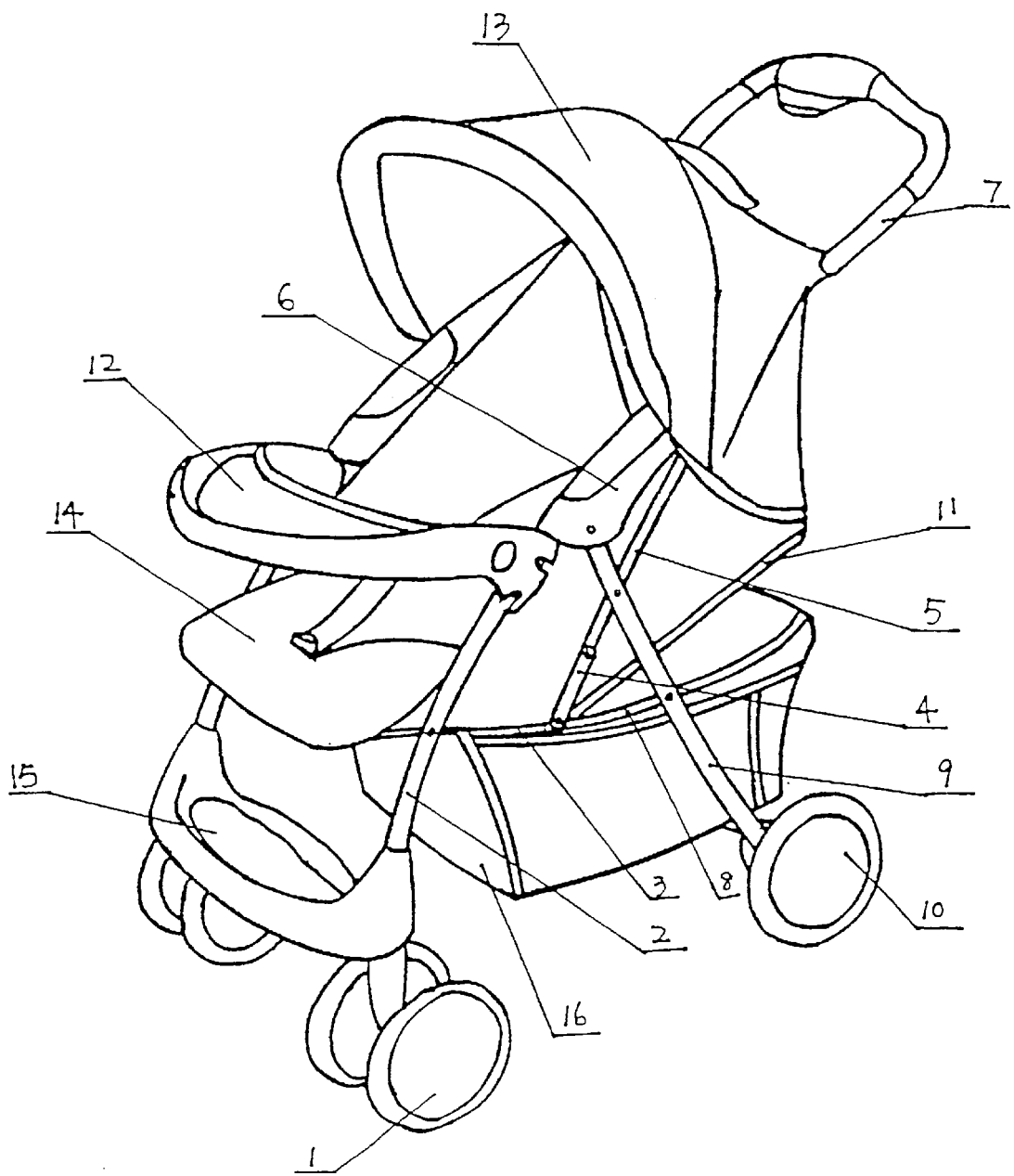
FIG. 6 is a perspective view of an embodiment of a collapsible stroller in a non-collapsed position.

In this embodiment, the stroller may further comprise a pedal 15 disposed between the two front legs, a tray 12 mounted above the seat and an awning 13, as shown in FIG. 6.

Figure 7:
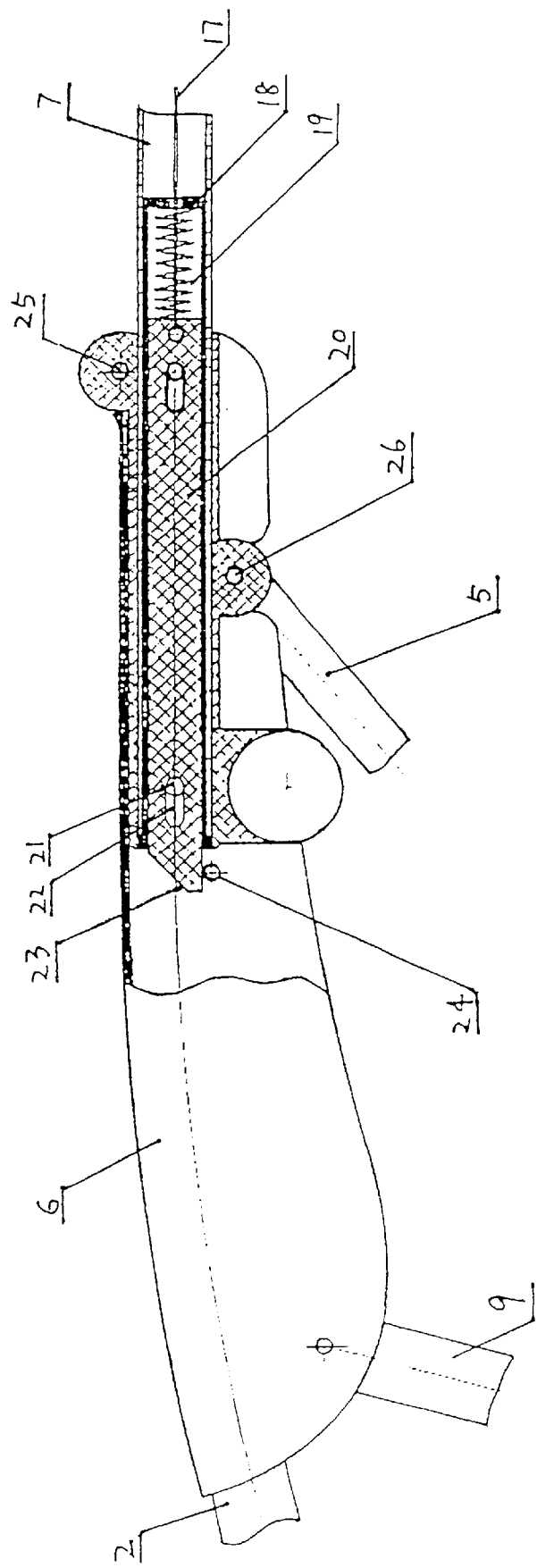
FIG. 7 is an enlarged fragmentary view of the connecting portion of the front leg, the handle rod, the rear rod and the first pull rod of the stroller illustrated in FIG. 6.

Referring now to FIG. 7, a locking device is mounted between the handle rod 7 and the front connecting rod 6 for keeping the stroller stable in case the stroller is in a non-collapsed position. The locking device comprises a bumper pin 24 fixed on the front connecting rod 6, a locking block 20 with a slope 23 at the front end thereof connected to the handle rod 7, a cable 17 connected to the locking block 20 and a spring 19 defined between the locking block 20 and a hinge 18. The bumper pin 24 blocks at the side of the locking block 20. When the stroller is collapsed, the cable 17 pulls the locking block 20 to make the slope 23 slide rightward so that the locking device can hereby be unlocked to collapse the stroller. When the stroller is released from the collapsed position, the fixed bumper pin 24 may slide on the slope 23, causing the slope 23 and locking block 20 to be biased rightward until the fixed bumper pin is below the slope 23 and locking block 20. At this point, the locking block slides leftward to the side of bumper pin 24 until the stroller is completely non-collapsed. In this case, as shown in FIG. 7, the locking device reverts to a locked situation. A bolt 21 is provided in the handle rod 7 to block the movement of the locking block 20 in the handle rod 7 by matching a slot 22 in the locking block 20 when the stroller is in the collapsed position and is used.

In the embodiment of the invention, a back rod 11 is provided to rotatably connect to the rotatable connecting point of the front supporting rod 3 and the rear supporting rod 8 so that the baby may sit or lie in the seat by adjusting the back rod 11.

Compared with the prior art, the present invention has the following advantages:

When the stroller is collapsed, the handle rod 7 will turn over forward. Moreover, both the collapsed front wheel and the rear wheel are able to support the stroller so that it can stand up vertically. This facilitates collapsing or operating the stroller simply with one hand.

What is claimed is:

1. A collapsible stroller, comprising:
    a handle rod;
    two sub-frames connected to the handle rod, the two sub-frames each including a front leg with an upper end and a rotatable front wheel disposed under the front leg, and a rear leg with an upper end and a rotatable rear wheel disposed under the rear leg, the upper end of the front leg rotatably connected to the upper end of the rear leg;
    a front connecting rod including one end rotatably connected to the handle rod and other end rotatably connected to the upper end of the front leg and the upper end of the rear leg;
    a seat mounted between the sub-frames for carrying an occupant;
    a front supporting rod rotatably mounted to the front leg;
    a rear supporting rod rotatably connected to the front supporting rod and rotatably mounted to the rear leg;
    a first pull rod rotatably connected to the rear leg, the first pull rod including an end rotatably connected to the handle rod and an other end;
    a second pull rod including an end rotatably coupled to the other end of the first pull rod and an other end rotatably connected to the front supporting rod and the rear supporting rod; and
    a locking device mounted between the handle rod and the front connecting rod for keeping the stroller stable in a non-collapsed position, the locking device including a bumper pin fixed on the front connecting rod, a locking block with a side and a front portion having a slope, the locking block slidably connected to the handle rod, a cable connected to the locking block to control movement of the locking block from a locked position to an unlocked position, the bumper pin preventing lateral movement of the locking block and handle rod, locking the handle rod in place, when the locking block is in the locked position.

2. The collapsible stroller in accordance with claim 1, wherein the upper end of the front leg is rotatably connected to the upper end of the rear leg at a rotatable connecting point, and the other end of the front connecting rod is rotatably connected to the rotatable connecting point of the front leg and the rear leg.

3. The collapsible stroller in accordance with claim 1, wherein the front supporting rod and the rear supporting rod are rotatably connected at a rotatable connecting point, and the other end of the second pull rod is rotatably connected to the rotatable connecting point of the front supporting rod and the rear supporting rod.

4. The collapsible stroller in accordance with claim 1, wherein the handle rod and the front connecting rod are rotatably connected at a rotatable connecting point, the handle rod and first pull rod are rotatably connected at a rotatable connecting point, and the rotatable connecting point of the handle rod and front connecting rod is positioned rearwardly of the rotatable connecting point of the handle rod and the first pull rod.

5. The collapsible stroller in accordance with claim 1, wherein the front supporting rod and the rear supporting rod are rotatably connected at a connecting point positioned between the front leg and the rear leg.

6. The collapsible stroller in accordance with claim 1, wherein the first pull rod and the rear leg are rotatably connected at a rotatable connecting point, the rear leg and the front leg are rotatably connected at a rotatable connecting point, the rear leg and the rear supporting rod are rotatably connected at a rotatable connecting point, and the rotatable connecting point of the first pull rod and the rear leg is positioned between the rotatable connecting points of the rear leg and the front leg and the rear leg and the rear supporting rod.

7. The collapsible stroller in accordance with claim 1, wherein the front leg, the front connecting rod and the handle rod are substantially located in line when the stroller is in a non-collapsed position.

8. The collapsible stroller in accordance with claim 1, further comprising a basket hanged on the rear supporting rod and the front supporting rod.

9. The collapsible stroller in accordance with claim 1, wherein the front leg and the rear leg are rotatably connected at a rotatable connection point, the front wheel contacts the ground at a front wheel ground-contacting point, the rear wheel contacts the ground at a rear wheel ground-contacting point, and the distance from the rotatable connection point to the front wheel ground-contacting point is the same as the distance from the rotatable connection point to the rear wheel ground-contacting point so that the stroller, when collapsed, may be stood up vertically without falling.

10. The collapsible stroller in accordance with claim 1, wherein the front supporting rod and the rear supporting rod are rotatably connected at a rotatable connecting point, and the collapsible stroller further includes a back rod rotatably connected to the connecting point of the front supporting rod and the rear supporting rod.

* * * * *